United States Patent
Jeong et al.

(10) Patent No.: US 9,092,259 B2
(45) Date of Patent: Jul. 28, 2015

(54) APPARATUS AND METHOD FOR CONTROLLING A RESOURCE UTILIZATION POLICY IN A VIRTUAL ENVIRONMENT

(75) Inventors: Hyun-Ku Jeong, Daejeon-si (KR);
Sung-Min Lee, Suwon-si (KR);
Sang-Bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 646 days.

(21) Appl. No.: 13/156,416

(22) Filed: Jun. 9, 2011

(65) Prior Publication Data
US 2012/0084787 A1  Apr. 5, 2012

(30) Foreign Application Priority Data

Oct. 5, 2010 (KR) ........................ 10-2010-0096875

(51) Int. Cl.
*G06F 9/46* (2006.01)
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS

| | | | |
|---|---|---|---|
| 8,104,038 B1 * | 1/2012 | Graupner | 718/104 |
| 2005/0013282 A1 * | 1/2005 | Lott et al. | 370/349 |
| 2005/0022201 A1 * | 1/2005 | Kaneda et al. | 718/104 |
| 2008/0028398 A1 * | 1/2008 | Cherkasova et al. | 718/1 |
| 2008/0028410 A1 * | 1/2008 | Cherkasova et al. | 718/104 |
| 2008/0181245 A1 | 7/2008 | Basso et al. | |
| 2008/0229318 A1 | 9/2008 | Franke | |
| 2009/0248922 A1 * | 10/2009 | Hinohara et al. | 710/56 |
| 2010/0037232 A1 | 2/2010 | Lee et al. | |

FOREIGN PATENT DOCUMENTS

| | | |
|---|---|---|
| JP | 2006-101131 | 4/2006 |
| JP | 2008-234632 | 10/2008 |
| KR | 10-2009-0094256 | 9/2009 |
| KR | 10-2010-0018446 | 2/2010 |

* cited by examiner

*Primary Examiner* — Gregory A Kessler
(74) *Attorney, Agent, or Firm* — NSIP Law (57) ABSTRACT

An apparatus and method for controlling a resource utilization policy in a virtual environment are provided. The apparatus may increase network throughput by dynamically adjusting the resource utilization policies of a driver domain that can directly access a shared device, and a guest driver that cannot directly access the shared device. In addition, the apparatus may improve the efficiency of the use of CPU resources by appropriately adjusting the CPU occupancy rates of the driver and guest domains.

19 Claims, 6 Drawing Sheets

APPARATUS AND METHOD FOR CONTROLLING A RESOURCE UTILIZATION POLICY IN A VIRTUAL ENVIRONMENT

CROSS-REFERENCE TO RELATED APPLICATION(S)

This application claims the benefit under 35 U.S.C. §119(a) of Korean Patent Application No. 10-2010-0096875, filed on Oct. 5, 2010, in the Korean Intellectual Property Office, the entire disclosure of which is incorporated herein by reference for all purposes.

BACKGROUND

1. Field

The following description relates to a resource management technique, and more particularly, to a technique of controlling a resource utilization policy in a virtual environment.

2. Description of the Related Art

A virtual environment includes an environment in which a plurality of domains each having an operating system (OS) and one or more applications may be run by a hypervisor, which is a type of virtual software.

In a virtual environment in which a plurality of domains share a single device using a split device driver (SDD) manner, domains (i.e., guest domains) that cannot directly access the shared device may need to communicate with external devices via other domains (i.e., driver domains) that can directly access the shared device. For example, the shared device may be any device that can be shared by multiple domains via an SDD such as a storage device (e.g., a network interface card, a hard disc drive, or a flash memory) or a USB serial device (e.g., a mouse). The network throughput and the CPU occupancy rate in the virtual environment are dependent on how much CPU resources are distributed by the hypervisor between the driver domains and the guest domains.

SUMMARY

In one general aspect, there is provided an apparatus for controlling a resource utilization policy in a virtual environment, the apparatus including a decision-making unit configured to decide to dynamically adjust the resource utilization policies of a driver domain that directly accesses a shared device and a guest domain that does not directly access the shared device, and a policy management unit configured to dynamically adjust the resource utilization policies of the driver domain and the guest domain based on the decision made by the decision-making unit.

The policy management unit may transmit information for determining a resource utilization policy to the decision-making unit at regular intervals of time or upon the occurrence of a particular event, and may request the decision-making unit to decide whether to dynamically adjust the resource utilization policies of the driver domain and the guest domain.

The decision-making unit may determine a scheduler and parameters values to which the determined scheduler or a current scheduler is to be set to, based on the information transmitted by the policy management unit, and may transmit a decision-making response including the results of the determination to the policy management unit.

The policy management unit may reset the parameters of the current scheduler or replace the current scheduler based on the decision-making response transmitted by the decision-making unit to dynamically adjust the resource utilization policies of the driver domain and the guest domain.

The information for determining a resource utilization policy may include the type of application or service executed or performed in the guest domain.

The information for determining a resource utilization policy may include packet inter-arrival time information.

The information for determining a resource utilization policy may include domain switching rate information.

The information for determining a resource utilization policy may include CPU occupancy rate information of the driver domain and the guest domain.

The information for determining a resource utilization policy may include read/write pattern information.

The policy management unit may vary the CPU occupancy rates of the driver domain and the guest domain to dynamically adjust the resource utilization policies of the driver domain and the guest domain.

The policy management unit may perform domain switching to limit the number of times the driver domain and the guest domain are switched between foreground and background to a range that satisfies the resource utilization policies of the driver domain and the guest domain.

In another aspect, there is provided a method of controlling a resource utilization policy in a virtual environment, the method including deciding to dynamically adjust the resource utilization policies of a driver domain that directly accesses a shared device and a guest domain that does not directly access the shared device, and dynamically adjusting the resource utilization policies of the driver domain and the guest domains based on the decision.

The deciding may comprise determining, at regular intervals of time or upon the occurrence of a particular event, a scheduler or parameter values to which the determined scheduler or a current scheduler is to be set to, based on information for determining a resource utilization policy.

The dynamically adjusting the resource utilization policies of the driver domain and the guest domain may comprise resetting the parameters of the current scheduler to the determined parameter values or replacing the current scheduler with the determined new scheduler.

The information for determining a resource utilization policy may include the type of application or service executed or performed in the guest domain.

The information for determining a resource utilization policy may include packet inter-arrival time information.

The information for determining a resource utilization policy may include domain switching rate information.

The information for determining a resource utilization policy may include CPU occupancy rate information of the driver domain and the guest domain.

The information for determining a resource utilization policy may include read/write pattern information.

The dynamically adjusting the resource utilization policies of the driver domain and the guest domain may comprise varying the CPU occupancy rates of the driver domain and the guest domain.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

The term 'shared device,' as used herein, indicates, but is not limited to, a device that may be shared by multiple domains via an SDD such as a storage device (e.g., a network interface card, a hard disc drive, or a flash memory) or a USB serial device (e.g., a mouse).

Figure 1:
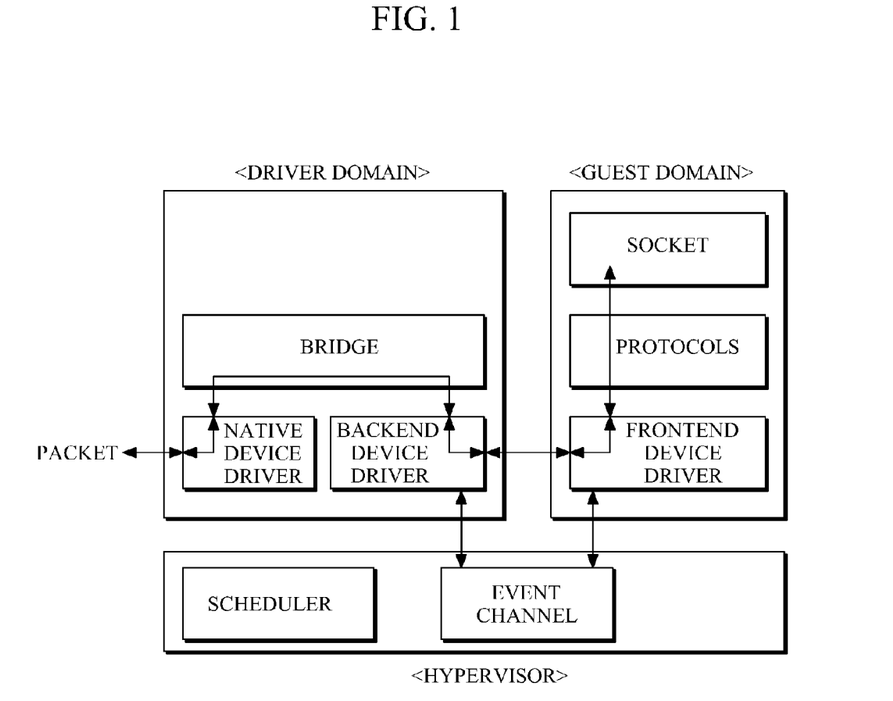
FIG. 1 is a diagram illustrating an example of the transmission of packets within a virtual environment.

FIG. 1 illustrates an example of the transmission of packets within a virtual environment. In this example, a guest domain may transmit a packet to an external device.

Referring to FIG. 1, when data is written on a socket by an application executed in the guest domain, a protocol stack may create a packet based on the data and may transmit the packet to a frontend device driver.

For example, the frontend device driver may copy the packet to a memory zone that is shared between the guest domain and a driver domain, and may notify a backend device driver of the driver domain via an event channel.

In response to the driver domain being switched to foreground, the backend device driver may read out the packet from the shared memory area, and may transmit the read-out packet to a native device driver of the driver domain. The native device driver may transmit the packet provided by the backend device driver to an external device.

The reception of a packet by the guest domain is the inverse of the transmission of a packet by the guest domain.

In response to the application executed in the guest domain transmitting a packet to or receiving a packet from an external device, the driver domain and the guest domain may cooperate with each other. Because the driver domain and the guest domain both use CPU resources to finish their tasks, CPU resources are allocated between the driver domain and the guest domain.

For example, if the guest domain is transmitting packets, the CPU occupancy rate of the guest domain may be increased, and the CPU occupancy rate of the driver domain may be reduced. As a result, the guest domain may transmit an increased amount of packets to the driver domain. However, if the number of packets transmitted from the guest domain to the driver domain exceeds the packet-handling capacity of the driver domain, packet loss may occur.

As another example, if the CPU occupancy rate of the driver domain is increased and the CPU occupancy rate of the guest domain is reduced, the packet-handling capacity of the driver domain may increase, and the packet-handling capacity of the guest domain may decrease. As a result, the network throughput may decrease.

Each of the driver domain and the guest domain may be switched from foreground to background or vice versa whenever processing a packet. However, frequent switching of the driver domain or the guest domain between foreground and background may result in increased expenses and deteriorate the general performance of the transmission of packets.

If the number of times the driver domain and the guest domain are switched between foreground and background is reduced, and the number of packets that can be processed when the driver domain and the guest domain are switched between foreground and background is increased, the cost of switching the driver domain and the guest domain between foreground and background may decrease. However, if the number of packets to be processed when the driver domain and the guest domain are switched between foreground and background increases too much, latency increases. As a result, the performance of the transmission of packets deteriorates. Therefore, it is necessary to keep a balance of the domain switching.

A hypervisor, which is a type of virtual software, may control the CPU occupancy rates of the driver domain and the guest domain and may control the switching of the driver domain and the guest domain between foreground and background, for example, based on a resource utilization policy. For example, the hypervisor may select a scheduler based on the resource utilization policy, may allocate CPU resources between the driver domain and the guest domain according to parameter values of the selected scheduler, and may switch the driver domain and the guest domain between foreground and background.

The structure and operation of an apparatus for controlling a resource utilization policy in a virtual environment is further described herein. The apparatus may dynamically adjust the resource utilization policies of a driver domain and a guest domain and may more efficiently allocate CPU resources between the driver domain and the guest domain and perform the switching of the driver domain and the guest domain between foreground and background.

Figure 2:
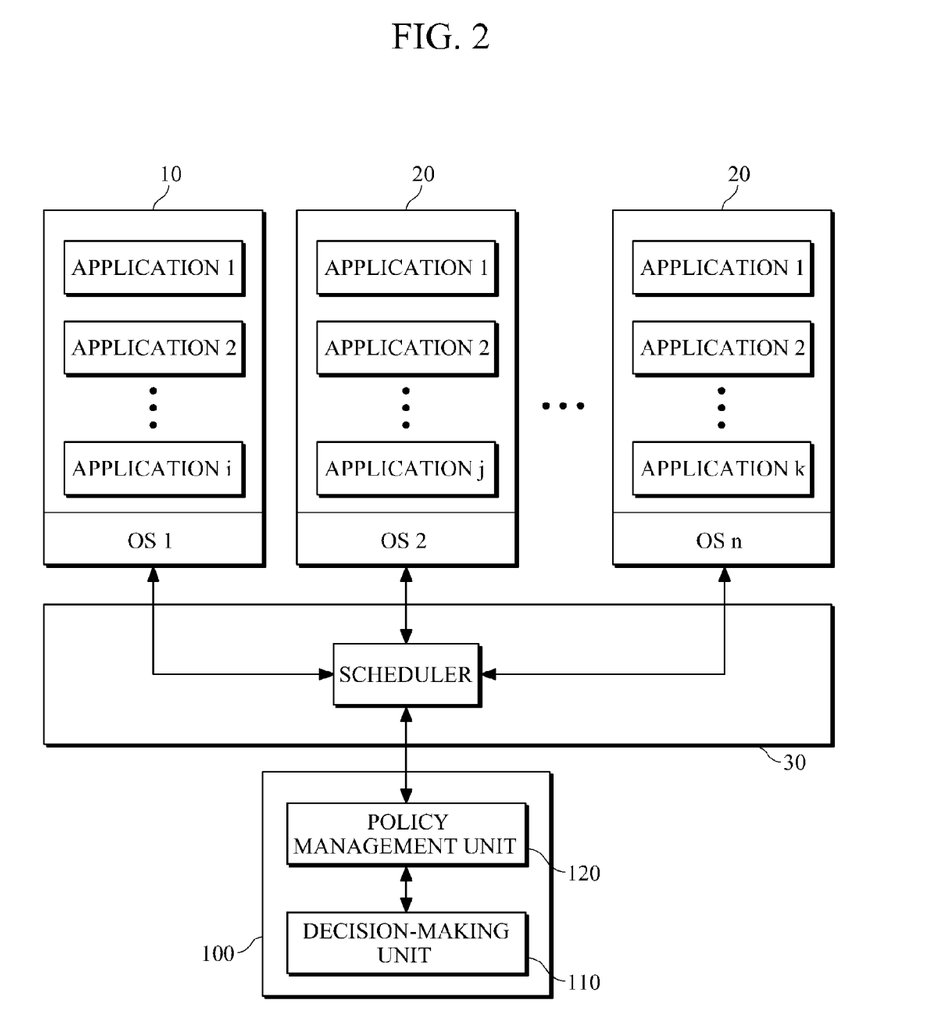
FIG. 2 is a diagram illustrating an example of an apparatus for controlling a resource utilization policy in a virtual environment.

FIG. 2 illustrates an example of an apparatus for controlling a resource utilization policy in a virtual environment. The apparatus may be included in a terminal, such as a computer, a mobile terminal, an MP3 player, and the like.

Referring to FIG. 2, apparatus 100 includes a decision-making unit 110 and a policy management unit 120.

The decision-making unit 110 decides whether to dynamically adjust the resource utilization policies of a driver domain 10 and at least one guest domain 20. In this example, the driver domain 10 is able to directly access a shared device such as a shared hardware device. Also in this example, the guest domain 20 does not directly access the shared device.

The policy management unit 120 may dynamically adjust a resource utilization policy based on the decision made by the decision-making unit 110. For example, the policy management unit 120 may transmit information used for determining a resource utilization policy to the decision-making unit 110 at regular intervals or upon the occurrence of a particular event. Accordingly, the decision-making unit 110 may determine whether to dynamically adjust a resource utilization policy based on the information received from the policy management unit 120.

The information for determining a resource utilization policy may be information added or updated to a memory area shared between the driver domain 10, the guest domain 20, and a hypervisor 30.

Examples of the information for determining a resource utilization policy include, but are not limited to, information about the type of application or service executed or performed in the guest domain 20, packet inter-arrival time information, domain switching rate information, CPU occupancy rate information of the driver domain 10 and the guest domain 20, read/write pattern information, and the like.

The decision-making unit 110 may determine a scheduler or a number of parameter values to which the determined scheduler or a current scheduler is to be set to based on the information for determining a resource utilization policy. The decision-making unit 110 may transmit a decision-making response including the results of the determination to the policy management unit 120.

For example, the decision-making unit 110 may determine a scheduler to replace the current scheduler and/or the parameters values to which the determined scheduler or the current scheduler is to be set to, using a particular algorithm designed for determining a resource utilization policy or according to a predefined set of rules for determining a resource utilization policy.

The policy management unit 120 may set the current scheduler to the parameter values determined by the decision-making unit 110 or may replace the current scheduler with the new scheduler determined by the decision-making unit 110 with reference to the decision-making response provided by the decision-making unit 110. In this example, the resource utilization policies of the driver and guest domains 10 and 20 may be dynamically adjusted. For example, the policy management unit 120 may dynamically adjust the resource utilization policies of the driver and guest domains 10 and 20 by varying the CPU occupancy rates of the driver domain 10 and the guest domain 20.

In response to the resetting of the parameters of the current scheduler or the replacement of the current scheduler being complete, the hypervisor 30 may drive the current scheduler or the scheduler that has replaced the current scheduler, and dynamically allocate CPU resources between the driver domain 10 and the guest domain 20 in accordance with the parameter values of the current scheduler or the scheduler that has replaced the current scheduler.

If the CPU occupancy rate of the guest domain 20 is increased and the CPU occupancy rate of the driver domain 10 is reduced, the number of packets that can be transmitted from the guest domain 20 to the driver domain 10 increases. However, if more packets than the driver domain 10 can handle are transmitted from the guest domain 20 to the driver domain 10, packet loss may occur.

As another example, if the CPU occupancy rate of the driver domain 10 is increased and the CPU occupancy rate of the guest domain 20 is reduced, the packet-handling capacity of the driver domain 10 increases. However, due to the reduced CPU occupancy rate of the guest domain 20, the network throughput, that is, the number of packets that can be transmitted within a predefined amount of time, may decrease.

In various aspects, the policy management unit 120 may dynamically adjust the resource utilization policies of the driver and guest domains 10 and 20 through the resetting of the parameters of the current scheduler or the replacement of the current scheduler so as to appropriately vary the CPU occupancy rates of the driver domain 10 and the guest domain 20. As a result, it is possible to increase network throughput and the efficiency of the use of CPU resources.

In various aspects, the policy management unit 120 may participate in domain switching and limit the number of times that the driver domain 10 and the guest domain 20 are switched between foreground and background to a range that satisfies the resource utilization policies of the driver and guest domains 10 and 20.

For example, each of the driver domain and the guest domain may be switched from foreground to background, or vice versa, whenever processing a packet. However, frequent switching of the driver domain or the guest domain between foreground and background may result in an increase of expenses and deteriorate the general performance of the transmission of packets.

If the number of times the driver domain and the guest domain are switched between foreground and background is reduced, and the number of packets that can be processed whenever the driver domain and the guest domain are switched between foreground and background is increased, the cost of switching the driver domain and the guest domain between foreground and background may decrease. However, if the number of packets that are processed when the driver domain and the guest domain are switched between foreground and background increases too much, latency may increase, and thus, the performance of the transmission of packets deteriorates.

Therefore, it is possible to keep a balance between the switching of the driver domain between foreground and background and the switching of the guest domain between foreground and background by allowing the policy management unit 120 to participate in domain switching and limit the number of times that the driver domain 10 and the guest domain 20 are switched between foreground and background. For example, policy management unit 120 may limit the switching to a range that satisfies the resource utilization policies of the driver and guest domains 10 and 20.

Figure 3:
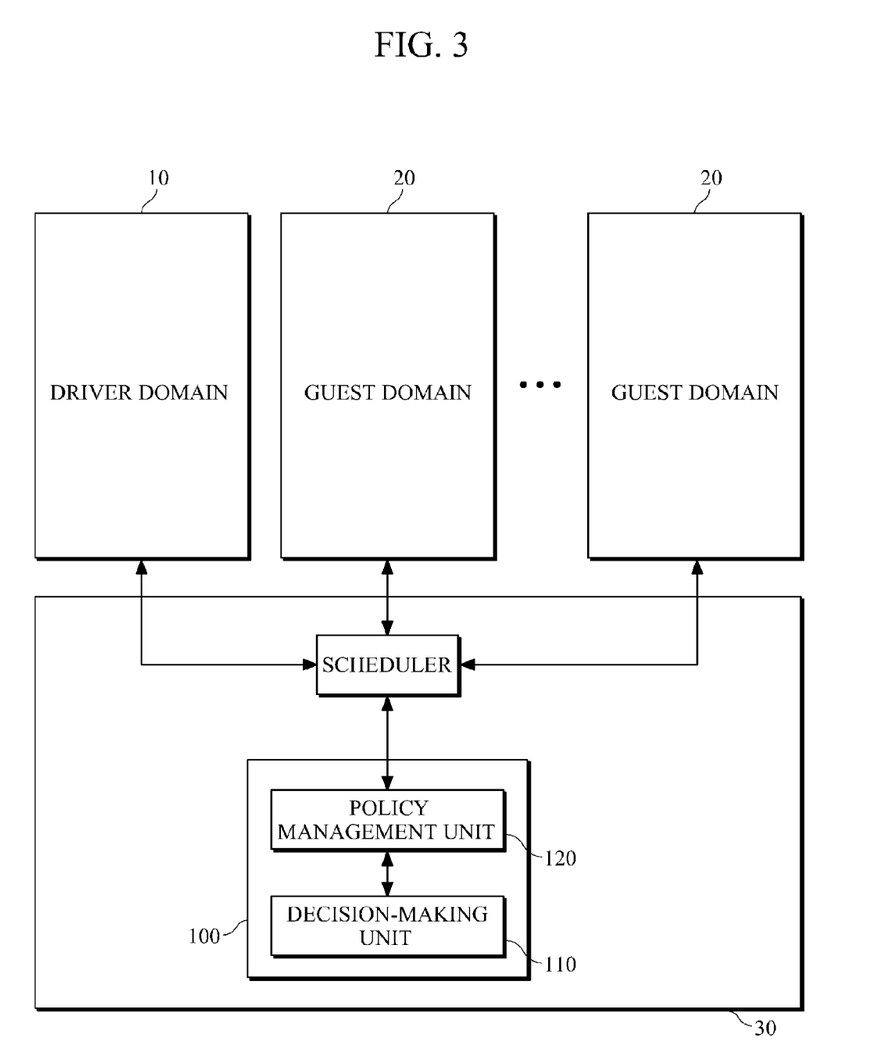
FIG. 3 is a diagram illustrating another example of the apparatus for controlling a resource utilization policy in a virtual environment.

FIG. 3 illustrates another example of an apparatus for controlling a resource utilization policy in a virtual environment. In this example, apparatus 100 is installed in a hypervisor 30.

Figure 4:
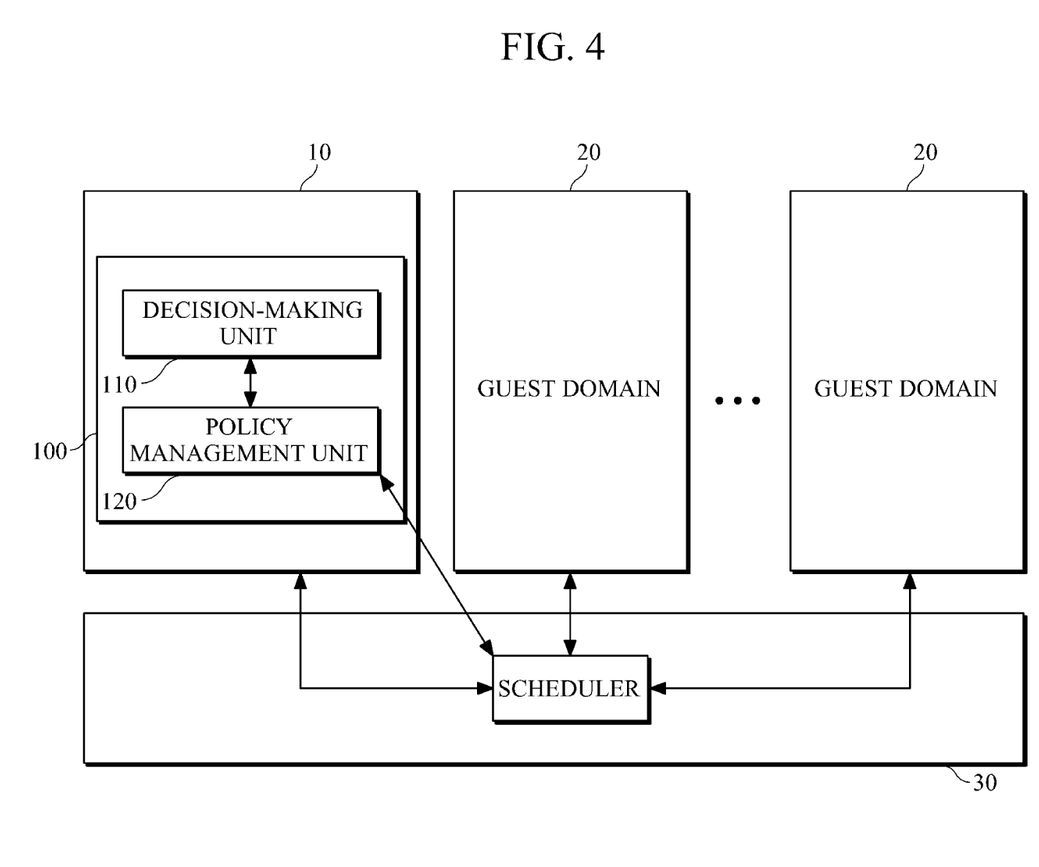
FIG. 4 is a diagram illustrating another example of the apparatus for controlling a resource utilization policy in a virtual environment.

FIG. 4 illustrates another example of an apparatus for controlling a resource utilization policy in a virtual environment. In this example, apparatus 100 is installed in a driver domain 10.

Figure 5:
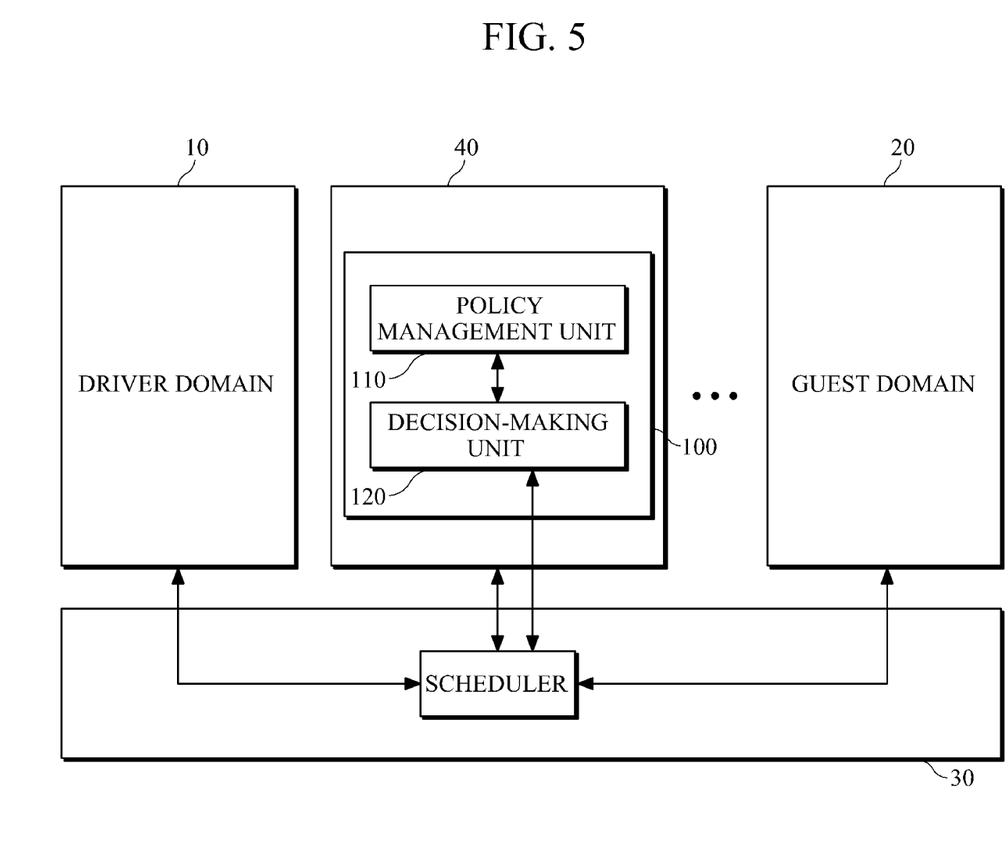
FIG. 5 is a diagram illustrating another example of the apparatus for controlling a resource utilization policy in a virtual environment.

FIG. 5 illustrates another example of an apparatus for controlling a resource utilization policy in a virtual environment. In this example, apparatus 100 is installed in a control domain 40.

Referring to FIGS. 3 through 5, the apparatus 100 may be installed in the hypervisor 30, in the driver domain 10, or in a control domain 40.

The operation of the apparatus 100 is further described with reference to FIG. 6.

Figure 6:
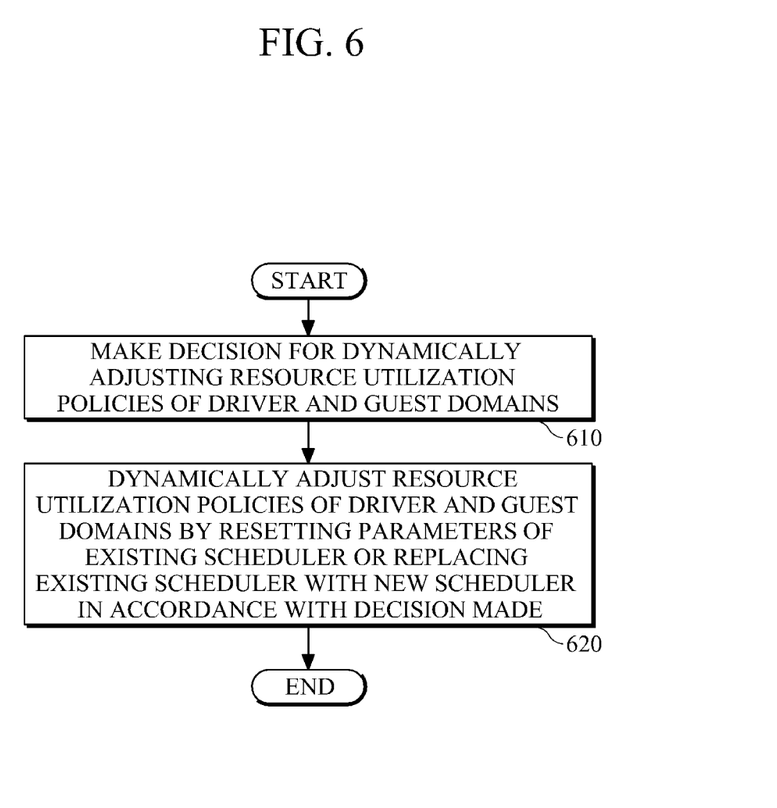
FIG. 6 is a flowchart illustrating an example of a method of controlling a resource utilization policy in a virtual environment.

FIG. 6 illustrates an example of a method of controlling a resource utilization policy in a virtual environment.

Referring to FIG. 6, in 610, the apparatus 100 makes a decision for dynamically adjusting the resource utilization policies of the driver domain 10 that can directly access a shared device, and the guest domain 20 that cannot directly access the shared device.

For example, the apparatus 100 may determine, at regular intervals of time or upon the occurrence of a particular event, a scheduler or parameter values to which the determined scheduler or a current scheduler is to be set to, based on information for determining a resource utilization policy. The information for determining a resource utilization policy may be information added or updated to a memory area shared between the driver domain 10, the guest domain 20, and a hypervisor 30.

Examples of the information for determining a resource utilization policy include, but are not limited to, information on the type of application or service executed or performed in the guest domain 20, packet inter-arrival time information, domain switching rate information, CPU occupancy rate information of the driver domain 10 and the guest domain 20, read/write pattern information, and the like.

In 620, the apparatus 100 dynamically adjusts the resource utilization policies of the driver and guest domains 10 and 20 according to the decision made in 610.

For example, the apparatus 100 may reset the current scheduler to the parameter values determined in 610 or replace the current scheduler with the scheduler determined in 610, thereby dynamically adjusting the resource utilization policies of the driver and guest domains 10 and 20. For example, in 620, the apparatus 100 may dynamically adjust the resource utilization policies of the driver and guest domains 10 and 20 by appropriately varying the CPU occupancy rates of the driver domain 10 and the guest domain 20.

In response to the resetting of the parameters of the current scheduler or the replacement of the current scheduler being complete, the hypervisor 30 may drive the current scheduler or the scheduler that has replaced the current scheduler, and dynamically allocate CPU resources between the driver domain 10 and the guest domain 20 in accordance with the parameter values of the current scheduler or the scheduler that has replaced the current scheduler.

If the CPU occupancy rate of the guest domain 20 is increased and the CPU occupancy rate of the driver domain 10 is reduced, the number of packets that can be transmitted from the guest domain 20 to the driver domain 10 increases. However, if more packets than the driver domain 10 can handle are transmitted from the guest domain 20 to the driver domain 10, packet loss may occur.

As another example, if the CPU occupancy rate of the driver domain 10 is increased and the CPU occupancy rate of the guest domain 20 is reduced, the packet-handling capacity of the driver domain 10 increases. However, due to the reduced CPU occupancy rate of the guest domain 20, the network throughput may decrease.

For example, in 620, the apparatus 100 may dynamically adjust the resource utilization policies of the driver and guest domains 10 and 20 through the resetting of the parameters of the current scheduler or the replacement of the current scheduler so as to appropriately vary the CPU occupancy rates of the driver domain 10 and the guest domain 20. Accordingly, it is possible to increase network throughput and the efficiency of the use of CPU resources.

As described above, it is possible to improve the efficiency of the use of CPU resources and thus improve general system performance by increasing network throughput or appropriately adjusting the CPU occupancy rates of a driver domain and a guest domain.

Various aspects herein relate to a technique of dynamically controlling a resource utilization policy regarding the use of resources by a driver domain that can directly access a shared device and a guest domain that cannot directly access the shared device.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for controlling a resource utilization policy in a virtual environment, the apparatus comprising:
 a decision-making unit configured to decide to dynamically adjust the resource utilization policies of a driver domain that directly accesses a shared device and a guest domain that does not directly access the shared device;

a policy management unit configured to dynamically adjust the resource utilization policies of the driver domain and the guest domain based on the decision made by the decision-making unit such that a number of packets transmitted by the guest domain and a number of packets received by the driver domain, during a predetermined interval, each satisfy a predetermined threshold, and configured to limit the number of times the driver domain and the guest domain are switched between foreground and background such that it satisfies the resource utilization policies of the driver domain and the guest domain; and a storage device configured to store at least one of the driver domain and the guest domain.

2. The apparatus of claim 1, wherein the policy management unit transmits information for determining a resource utilization policy to the decision-making unit at regular intervals of time or upon the occurrence of a particular event, and requests the decision-making unit to decide whether to dynamically adjust the resource utilization policies of the driver domain and the guest domain.

3. The apparatus of claim 2, wherein the decision-making unit determines a scheduler and parameters values to which the determined scheduler or a current scheduler is to be set to, based on the information transmitted by the policy management unit, and transmits a decision-making response including the results of the determination to the policy management unit.

4. The apparatus of claim 3, wherein the policy management unit resets the parameters of the current scheduler or replaces the current scheduler based on the decision-making response transmitted by the decision-making unit to dynamically adjust the resource utilization policies of the driver domain and the guest domain.

5. The apparatus of claim 2, wherein the information for determining a resource utilization policy includes the type of application or service executed or performed in the guest domain.

6. The apparatus of claim 2, wherein the information for determining a resource utilization policy includes packet inter-arrival time information.

7. The apparatus of claim 2, wherein the information for determining a resource utilization policy includes domain switching rate information.

8. The apparatus of claim 2, wherein the information for determining a resource utilization policy includes CPU occupancy rate information of the driver domain and the guest domain.

9. The apparatus of claim 2, wherein the information for determining a resource utilization policy includes read/write pattern information.

10. The apparatus of claim 1, wherein the policy management unit varies the CPU occupancy rates of the driver domain and the guest domain to dynamically adjust the resource utilization policies of the driver domain and the guest domain.

11. A method of controlling a resource utilization policy in a virtual environment, the method comprising:
deciding to dynamically adjust the resource utilization policies of a driver domain that directly accesses a shared device and a guest domain that does not directly access the shared device;
dynamically adjusting the resource utilization policies of the driver domain and the guest domains based on the decision such that a number of packets transmitted by the guest domain and a number of packets received by the driver domain, during a predetermined interval, each satisfy a predetermined threshold; and
limiting the number of times the driver domain and the guest domain are switched between foreground and background such that it satisfies the resource utilization policies of the driver domain and the guest domain.

12. The method of claim 11, wherein the deciding comprises determining, at regular intervals of time or upon the occurrence of a particular event, a scheduler or parameter values to which the determined scheduler or a current scheduler is to be set to, based on information for determining a resource utilization policy.

13. The method of claim 12, wherein the dynamically adjusting the resource utilization policies of the driver domain and the guest domain comprises resetting the parameters of the current scheduler to the determined parameter values or replacing the current scheduler with the determined new scheduler.

14. The method of claim 12, wherein the information for determining a resource utilization policy includes the type of application or service executed or performed in the guest domain.

15. The method of claim 12, wherein the information for determining a resource utilization policy includes packet inter-arrival time information.

16. The method of claim 12, wherein the information for determining a resource utilization policy includes domain switching rate information.

17. The method of claim 12, wherein the information for determining a resource utilization policy includes CPU occupancy rate information of the driver domain and the guest domain.

18. The method of claim 12, wherein the information for determining a resource utilization policy includes read/write pattern information.

19. The method of claim 11, wherein the dynamically adjusting the resource utilization policies of the driver domain and the guest domain comprises varying the CPU occupancy rates of the driver domain and the guest domain.

* * * * *